United States Patent
Kim et al.

(10) Patent No.: US 9,630,172 B2
(45) Date of Patent: Apr. 25, 2017

(54) PHOTOCATALYST COMPLEX

(71) Applicant: GWANGJU INSTITUTE OF SCIENCE AND TECHNOLOGY, Gwangju (KR)

(72) Inventors: Min-Gon Kim, Gwangju (KR); Hyo-Young Mun, Gwangju (KR); Ju-Young Byun, Gwangju (KR); Taihua Li, Gwangju (KR); Jin-Ho Park, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 0 days.

(21) Appl. No.: 14/901,715

(22) PCT Filed: Jul. 3, 2014

(86) PCT No.: PCT/KR2014/005975
§ 371 (c)(1),
(2) Date: Dec. 28, 2015

(87) PCT Pub. No.: WO2015/002490
PCT Pub. Date: Jan. 8, 2015

(65) Prior Publication Data
US 2016/0375432 A1    Dec. 29, 2016

(30) Foreign Application Priority Data
Jul. 3, 2013    (KR) .......................... 10-2013-0077538

(51) Int. Cl.
*B01J 23/10*    (2006.01)
*B01J 23/20*    (2006.01)
(Continued)

(52) U.S. Cl.
CPC ............... *B01J 31/38* (2013.01); *B01J 21/06* (2013.01); *B01J 21/063* (2013.01); *B01J 23/06* (2013.01);
(Continued)

(58) Field of Classification Search
CPC . B01J 21/063; B01J 23/10; B01J 23/20; B01J 23/30; B01J 23/52; B01J 35/004;
(Continued)

(56) References Cited

U.S. PATENT DOCUMENTS 3,535,245 A * 10/1970 Lindquist ................ C04B 35/26
252/62.57
7,338,590 B1 * 3/2008 Shelnutt ................. B01J 31/003
205/628
(Continued)

FOREIGN PATENT DOCUMENTS

CN    10-1642702    *    2/2010    ............. B01J 23/10
CN       101642702 A       2/2010
(Continued)

OTHER PUBLICATIONS

"Gold Nanorod/Fe3O4 Nanoparticle 'Nano-Pearl Necklaces' for Simultaneous Targeting, Dual-Mode Imaging, and Photothermal Ablation of Cancer Cells," Chungang Wang et al. Angew. Chem. Int. Ed., 2009, 48, pp. 2759-2763.*
(Continued)

*Primary Examiner* — Patricia L Hailey
(74) *Attorney, Agent, or Firm* — Hauptman Ham, LLP

(57) ABSTRACT

Provided are a titanium dioxide-coated upconverting nanoparticle (UCNP) and a photocatalyst complex containing a gold nanorod (GNR) combined with the titanium dioxide-coated UCNP.

11 Claims, 11 Drawing Sheets

(51) Int. Cl.
*B01J 23/52* (2006.01)
*B01J 31/38* (2006.01)
*B01J 21/06* (2006.01)
*B01J 35/02* (2006.01)
*B01J 37/02* (2006.01)
*B01J 35/00* (2006.01)
*B01J 23/06* (2006.01)
*B01J 23/30* (2006.01)
*B01J 31/02* (2006.01)
*B01J 31/06* (2006.01)
*B01J 31/26* (2006.01)

(52) U.S. Cl.
CPC ............ *B01J 23/20* (2013.01); *B01J 23/30* (2013.01); *B01J 23/52* (2013.01); *B01J 31/0205* (2013.01); *B01J 31/0218* (2013.01); *B01J 31/0229* (2013.01); *B01J 31/0249* (2013.01); *B01J 31/0271* (2013.01); *B01J 31/06* (2013.01); *B01J 31/26* (2013.01); *B01J 35/004* (2013.01); *B01J 35/008* (2013.01); *B01J 35/0013* (2013.01); *B01J 35/02* (2013.01); *B01J 35/023* (2013.01); *B01J 37/0215* (2013.01); *B01J 37/0221* (2013.01); *B01J 37/0225* (2013.01)

(58) Field of Classification Search
CPC ... B01J 35/008; B01J 37/0215; B01J 37/0221
USPC ........ 502/302–305, 307, 309, 311, 312, 317, 502/350; 428/403; 977/700, 775, 810
See application file for complete search history.

(56) References Cited

U.S. PATENT DOCUMENTS

| | | | |
|---|---|---|---|
| 2009/0201496 A1* | 8/2009 | Lee | G01N 21/658 356/301 |
| 2012/0094192 A1* | 4/2012 | Qu | B01J 13/02 429/336 |
| 2012/0136241 A1* | 5/2012 | Chen | A61K 49/0002 600/420 |
| 2012/0145532 A1 | 6/2012 | Smolyakov et al. | |
| 2014/0243934 A1* | 8/2014 | Vo-Dinh | A61K 49/0039 607/88 |
| 2014/0256534 A1* | 9/2014 | Gao | B01D 53/944 502/5 |
| 2016/0013340 A1* | 1/2016 | Mirkin | C25D 1/04 257/21 |

FOREIGN PATENT DOCUMENTS

| | | | | |
|---|---|---|---|---|
| CN | 10-4001506 | * | 8/2014 | ............ B01J 23/52 |
| CN | 10-5413712 | * | 3/2016 | ............ B01J 27/04 |
| CN | 10-5688900 | * | 6/2016 | ............ B01J 23/52 |

OTHER PUBLICATIONS

Lequan Liu et al., "Gold-Nanorod-Photosensitized Titanium Dioxide with Wide-Range Visible-Light Harvesting Based on Localized Surface Plasmon Resonance", Angew. Chem. Int. Ed. 2013, 52 , pp. 6689-6693. Total 5 pages.

Office Action issued Sep. 30, 2016 from Chinese Patent Office in connection with the counterpart Chinese patent application No. 201480037617.9.

Ping, Lu et al., "Fabrication of a TiO2/Au Nanorod Array for Enhanced Photocatalysis", Chinese Journal of Catalysis, 2011, pp. 1838-1843, vol. 32, No. 12.

Qin, Weiping et al., "Near-infrared photocatalysis based on YF3 : Yb3+, Tm3+/TiO2 core/shell nanoparticles", Chem. Commun., The Royal Society of Chemistry, Jan. 2010, pp. 2304-2306, vol. 46, No. 13.

Shouqiang Huang, "Near-infrared photocatalyst of Er3+/Yb3+ codoped(CaF2@TiO2) nanoparticles with active-core/active-shell structure", Journal of Materials Chemistry A, May 2013, pp. 7874-7879, vol. 1.

Xingyuan Guo, "Near-infrared photocatalysis of β-NaYF4:Yb3+, Tm3+@ZnO composites", Phys. Chem. Chem. Phys., the Owner Societies, Jun. 2013, pp. 14681-14688, vol. 15.

International Search Report for PCT/KR2014/005975 mailed on Oct. 7, 2014.

\* cited by examiner

PHOTOCATALYST COMPLEX

TECHNICAL FIELD

The present invention relates to a hybrid nanomaterial obtained by bonding gold nanorod particles, upconverting nanoparticles and titanium dioxide nanoparticles together, and activation of a titanium dioxide photocatalyst with NIR light using the same.

BACKGROUND ART

A photocatalyst generally refers to a material which causes strong oxidation-reduction by light energy and has semiconductor properties. When energy in a specific region is applied to a semiconductor, atoms of the semiconductor are excited from the valence band to the conduction band. Here, electrons ($e^-$) are formed in the conduction band and holes ($h^+$) are formed in the valence band. These electrons and holes cause various reactions such as decomposition of organic materials through strong oxidation or reduction. Such reactions are utilized to sterilize, antibacterialize, decompose, deodorize, and collect substances adhering to a surface of a material or contaminants in air or a solution, and photocatalysts using such reactions have been used in a variety of fields including cooler fillers, glass, tiles, outer walls, foods, inner walls of a factory, metal products, water tanks, purification of marine pollution, fungus prevention, UV protection, water purification, atmosphere purification, and hospital infection prevention and are recently applied to the field of producing hydrogen from water due to their capability of accelerating decomposition of water.

Among such photocatalysts, titanium dioxide ($TiO_2$) is most widely used due to its excellent photoactivity, chemical and biological stability, and durability. However, titanium dioxide exhibits photocatalytic properties only in the UV region. UV light accounts for only about 3% (32 $W/m^2$) of the total amount of sunlight (1004 $W/m^2$), and, in cloudy weather, the atmosphere transmits even less UV light due to low transmittance of cloud.

DISCLOSURE

Technical Problem

It is an aspect of the present invention to provide a near-infrared responsive photocatalyst composite.

Technical Solution

In accordance with one aspect of the present invention, a photocatalyst composite includes: upconverting nanoparticles coated with a photocatalytic metal oxide; and gold nanorods.

In the photocatalyst composite, the number of upconverting nanoparticles may be 2 to 8 times the number of gold nanorods.

The upconverting nanoparticles may include a rare-earth element.

The photocatalytic metal oxide may include at least one selected from the group consisting of titanium dioxide, tungsten oxide, zinc oxide, niobium oxide, and a combination thereof.

The upconverting nanoparticles may have an average diameter of 5 nm to 40 nm.

The photocatalytic metal oxide may be coated onto the upconverting nanoparticles to an average thickness of 2 nm to 20 nm.

The gold nanorods may have a rod shape, the shortest diameter of which ranges from 5 nm to 30 nm and the length of a major axis of which ranges from 30 nm to 150 nm.

The upconverting nanoparticles coated with the photocatalytic metal oxide may be physically or chemically bonded to the gold nanorods.

The upconverting nanoparticles coated with the photocatalytic metal oxide may be physically or chemically bonded to the gold nanorods through intermediate compounds.

The upconverting nanoparticles coated with the photocatalytic metal oxide may be bonded to the gold nanorods directly or through intermediate compounds.

The photocatalyst composite may be obtained by introducing a combination of streptavidin and biotin or a combination of an amine compound and a carboxyl acid-containing compound, as the intermediate compounds, to surfaces of the photocatalytic metal oxide and the gold nanorods, respectively, and bonding the upconverting nanoparticles to the gold nanorods.

The photocatalyst composite is activated by near-infrared light and secures excellent photocatalytic efficiency.

BEST MODE

Figure 1:
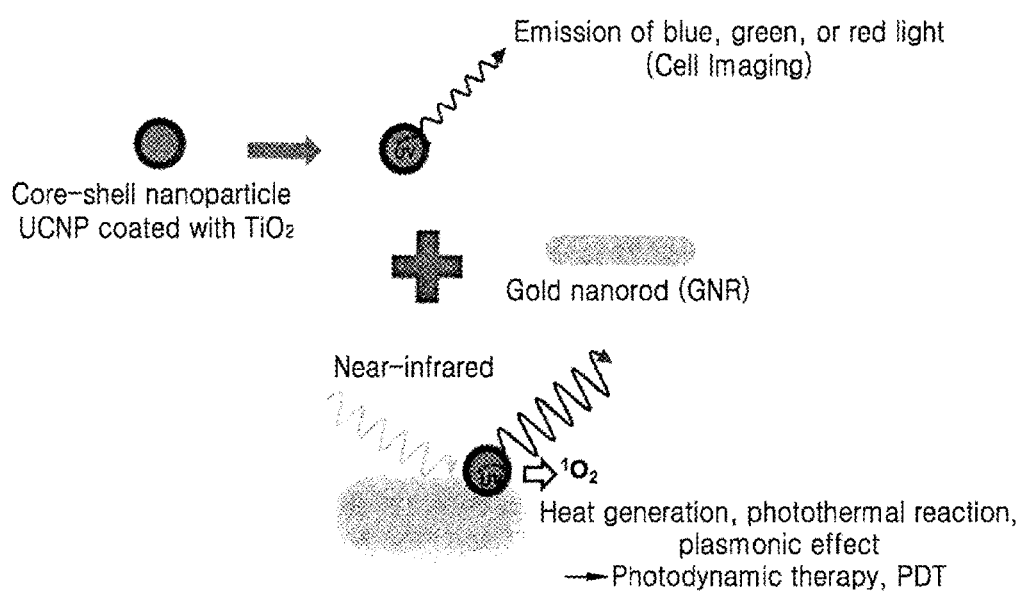
FIG. 1 is a schematic view of titanium dioxide-coated upconverting nanoparticles fixed to gold nanorods through physical or chemical bonds and used for photocatalysis and photo-dynamic therapy.

Hereinafter, embodiments of the present invention will be described in detail. However, it should be understood that the present invention is not limited to the following embodiments and should be defined only by the accompanying claims and equivalents thereof.

In accordance with one aspect of the present invention, there is provided a photocatalyst composite including: upconverting nanoparticles (UCNPs) coated with a photocatalytic metal oxide; and gold nanorods (GNRs).

The photocatalytic metal oxide, with which the upconverting nanoparticles are coated, exhibits excellent photoactivity under light in the UV range and is a photocatalytic material which has good properties in terms of chemical and biological stability and durability.

The photocatalytic metal oxide may be any photocatalytic material known in the art without limitation and may include at least one selected from the group consisting of titanium dioxide, tungsten oxide, zinc oxide, niobium oxide, and a combination thereof.

Photocatalysis of the photocatalytic metal oxide, such as titanium dioxide, included in the photocatalyst composite can be activated under near-infrared light.

The upconverting nanoparticles are materials which absorb light in the near-infrared range and emit light in the UV and visible ranges and may be any suitable material known in the art without limitation. For example, the upconverting nanoparticles may be nanoparticles mainly composed formed of rare-earth elements.

Specifically, the upconverting nanoparticles may have an average diameter of about 5 nm to about 40 nm.

Due to the aforementioned characteristics of the upconverting nanoparticles, when the upconverting nanoparticles coated with the photocatalytic metal oxide are irradiated with light in the near-infrared range, the upconverting nanoparticles can emit UV light and visible light and the photocatalytic metal oxide, with which the upconverting nanoparticles are coated, can exhibit photoactivity under UV light emitted from the upconverting nanoparticles.

In the photocatalyst composite, photocatalysis of titanium dioxide can be further activated by the gold nanorods combined with the upconverting nanoparticles. Although the upconverting nanoparticles themselves emit large amounts of light in the visible range and emit very slight amounts of light in the UV range, the gold nanorods combined with the photocatalytic metal oxide-coated upconverting nanoparticles allow plasmonic interaction between the photocatalytic metal oxide and the gold nanorods to be maximized upon irradiation with light, thereby increasing photocatalytic efficiency of the photocatalytic metal oxide.

The gold nanorods have a rod shape in which the sectional diameter of the rod shape, i.e. the shortest diameter of a gold nanorod particle may range from about 5 nm to about 30 nm and the height of the rod shape, i.e. the length of a major axis of the rod shape may range from about 30 nm to about 150 nm.

When the photocatalyst composite is applied to fields using photocatalysts, such as hydrogen generation, it is possible to use infrared light making up about 50% or more of sunlight rather than UV light accounting for only about 3% of sunlight. In addition, use of infrared light having high penetration ability makes it possible to reduce photocatalyst loss even when weather conditions are unfavorable.

In the photocatalyst composite, the number of upconverting nanoparticles may be about 2 to 8 times the number of gold nanorods. Within this range, the photocatalyst composite can be responsive to near-infrared light and have excellent photocatalytic efficiency.

The photocatalytic metal oxide may be coated onto the upconverting nanoparticles to an average thickness of about 2 nm to about 20 nm. The photocatalyst composite including the upconverting nanoparticles coated with the photocatalytic metal oxide to the above thickness can be responsive to near-infrared light and have excellent photocatalytic efficiency.

The upconverting nanoparticles coated with the photocatalytic metal oxide can form bonds with the gold nanorods, wherein the bonds may refer to physical or chemical bonds. Examples of the chemical bond may include a covalent bond and an ionic bond, and examples of the physical bond may include adsorption.

As such, the upconverting nanoparticles coated with the photocatalytic metal oxide can be fixed to the gold nanorods through physical or chemical bonds, thereby allowing plasmonic interaction between the photocatalytic metal oxide and the gold nanorods.

Physical or chemical bonds between the photocatalytic metal oxide-coated upconverting nanoparticles and the gold nanorods may be formed by directly bonding the photocatalytic metal oxide-coated upconverting nanoparticles to the gold nanorods or by indirect bonding through intermediate compounds.

FIG. 1 is a schematic view of photocatalytic metal oxide-coated upconverting nanoparticles fixed to gold nanorods through physical or chemical bonds and used for photocatalysis and photodynamic therapy (PDT).

The photocatalyst composite can improve photocatalytic efficiency by applying plasmonic effects to photocatalysis.

As described above, intermediate compounds may be used to fix the photocatalytic metal oxide-coated upconverting nanoparticles to gold nanorods through physical or chemical bonds. In other words, physical or chemical bonds may be formed by modifying surfaces of one or both of the photocatalytic metal oxide-coated upconverting nanoparticles and the gold nanorods with intermediate compounds.

When the photocatalytic metal oxide-coated upconverting nanoparticles are directly bonded to the gold nanorods, fabrication methods, processing conditions, and the like may be adjusted such that the physical or chemical bonds can be formed without using intermediate compounds in preparation of the photocatalyst composite.

In the former case, the photocatalyst composite may be formed by modifying the surfaces of the photocatalytic metal oxide-coated upconverting nanoparticles and/or the gold nanorods with intermediate compounds for bonding the photocatalytic metal oxide-coated upconverting nanoparticles to the gold nanorods and reacting the intermediate compounds to bond the photocatalytic metal oxide-coated upconverting nanoparticles to the gold nanorods.

For example, the titanium dioxide-coated upconverting nanoparticles are surface-modified with an amine compound and the gold nanorods are surface-modified with mercaptosuccinic acid, followed by reacting the surface-modified titanium dioxide-coated upconverting nanoparticles with the surface-modified gold nanorods, whereby amine groups introduced to the surfaces of the titanium dioxide-coated upconverting nanoparticles react with carboxyl groups introduced to the surface of the gold nanorods to form amide groups, thereby allowing the titanium dioxide-coated upconverting nanoparticles to form chemical bonds with the gold nanorods.

Since the surfaces of the upconverting nanoparticles are coated with the photocatalytic metal oxide, a compound for surface modification, such as amine, can be introduced to the surfaces of the photocatalytic metal oxide coatings.

As such, chemical bonds may be formed by introducing amine groups to the surfaces of any one of the photocatalytic metal oxide-coated upconverting nanoparticles and the gold nanorods and introducing carboxyl groups to the surfaces of the other ones to form amide bonds. In order to use the EDC/NHS reaction of 1-ethyl-3(3-dimethyl aminopropyl)carbodiimide (EDC) and N-hydroxysuccinimide (NHS) for formation of amide bonds, for example, 1-ethyl-3(3-dimethyl aminopropyl)carbodiimide and N-hydroxysuccinimide may be added to the modified titanium dioxide-coated upconverting nanoparticles and the modified gold nanorods to be allowed to react therewith.

Figure 2:
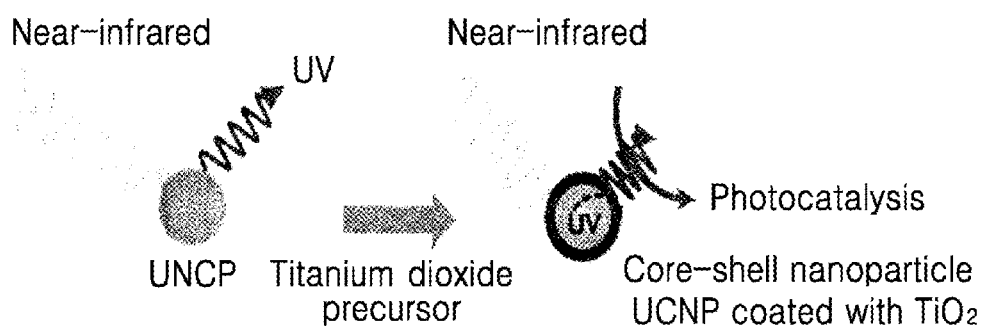
FIG. 2 is a view illustrating a method of coating titanium dioxide onto surfaces of upconverting nanoparticles.

FIG. 2 is a view schematically illustrating a method of coating titanium dioxide onto the surfaces of the upconverting nanoparticles.

For example, titanium dioxide may be coated onto the surfaces of the upconverting nanoparticles to a constant thickness by a sol-gel method using a titanium dioxide precursor, thereby fabricating the titanium dioxide-coated upconverting nanoparticles. As the titanium dioxide precursor, for example, tetra n-butyl titanate ($TiOBu_4$) may be used.

Next, a method for fabricating the photocatalyst composite will be described with reference to examples. It should be understood that a method for fabricating the photocatalyst composite is not limited thereto.

First, a mixed solution of an upconverting nanoparticle precursor and a solvent is heat-treated under a nitrogen atmosphere and then reacted through microwave irradiation, followed by cooling to room temperature, thereby preparing upconverting nanoparticles. Then, the prepared upconverting nanoparticles are coated with titanium dioxide by a sol-gel method using an ultrasonicator. After an amine compound is introduced to the surface of the titanium dioxide coating for surface-modification, the upconverting nanoparticles are mixed with mercaptosuccinic acid-modified gold nanorods. Here, EDC and NHS are also mixed therewith to perform organic synthesis using EDC/NHS reaction, thereby preparing a photocatalyst composite composed of the titanium dioxide-coated upconverting nanoparticles and the gold nanorods.

Photocatalysis of the prepared photocatalyst composite of the titanium dioxide-coated upconverting nanoparticles and the gold nanorods may be checked using methylene blue, which is generally used for confirmation of photocatalytic reaction.

Next, the present invention will be described in more detail with reference to some examples. However, it should be understood that these examples are provided for illustration only and are not to be in any way construed as limiting the present invention.

EXAMPLES

Comparative Example 1

Figure 3:
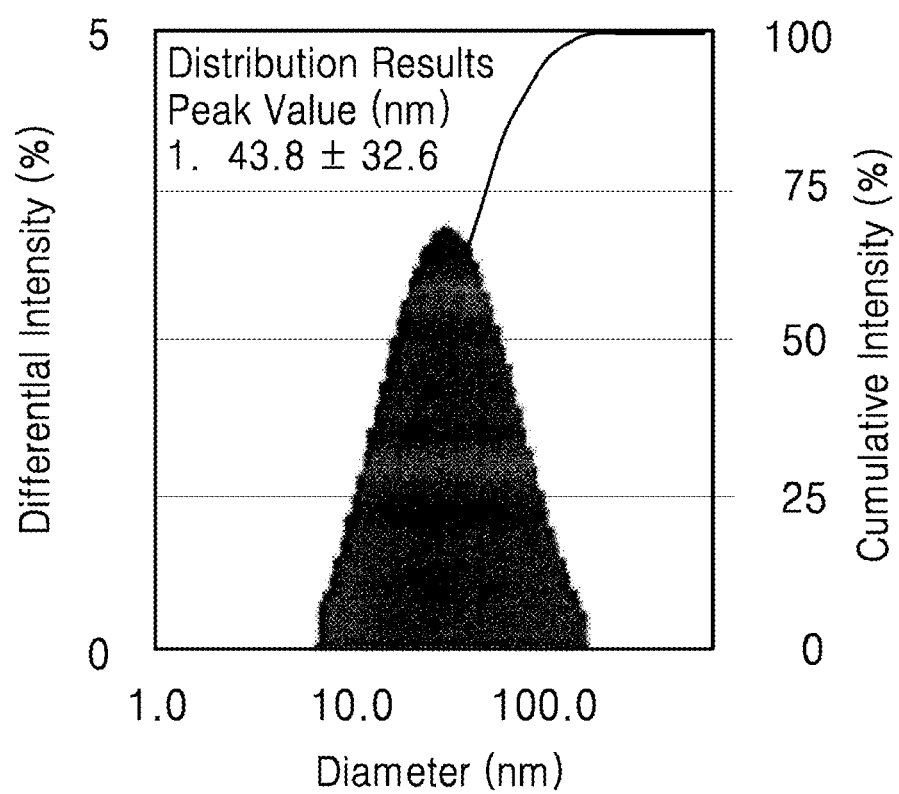
FIG. 3 shows results of analyzing the particle size of upconverting nanoparticles (UCNPs) prepared in examples using a particle size analyzer.

Confirmation of Characteristics of Prepared UCNP 72 g of sodium trifluoroacetate (Na-TFA), 120 g of yttrium trifluoroacetate (Y-TFA), 44 g of ytterbium trifluoroacetate (Yb-TFA), and 4 g of thulium trifluoroacetate (Tm-TFA) were placed in a mixed solution of 5 ml of oleic acid and 5 ml of octadecane and reacted at 120° C. for 30 minutes under a nitrogen atmosphere, and the resulting reaction mixture was transferred into a microwave oven (Synthesizer, CEM (US)) and reacted at 290° C. for 5 minutes, followed by cooling to room temperature, thereby preparing upconverting nanoparticles (UCNPs). The prepared UCNPs were analyzed as to particle size using a particle size and zeta potential analyzer (ELS Z, Photal Otsuka Electronics (Japan)). FIG. 3 is a graph showing results of the above analysis.

Figure 4:
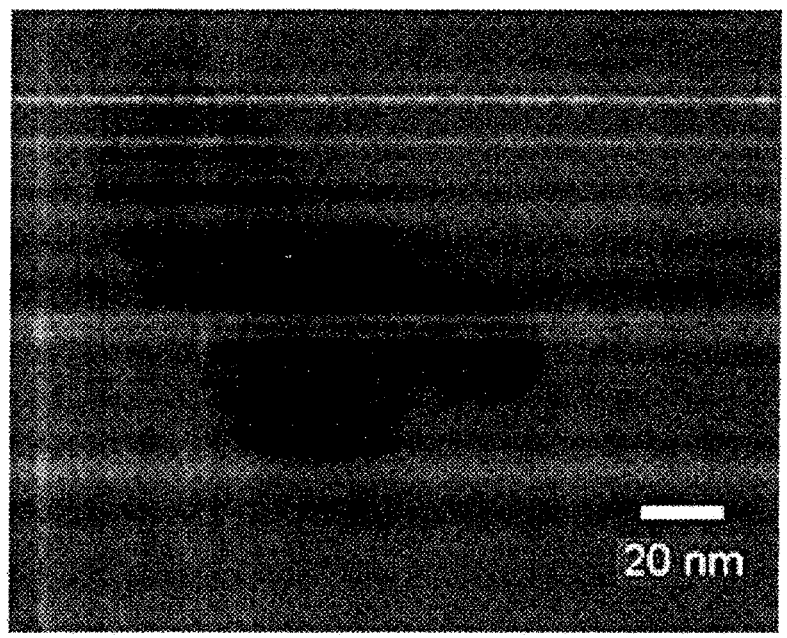
FIG. 4 is a transmission electron microscope (TEM) image of the upconverting nanoparticles (UCNPs) prepared in examples.

FIG. 4 is a transmission electron microscope (TEM) image of the prepared UCNPs.

Figure 5:
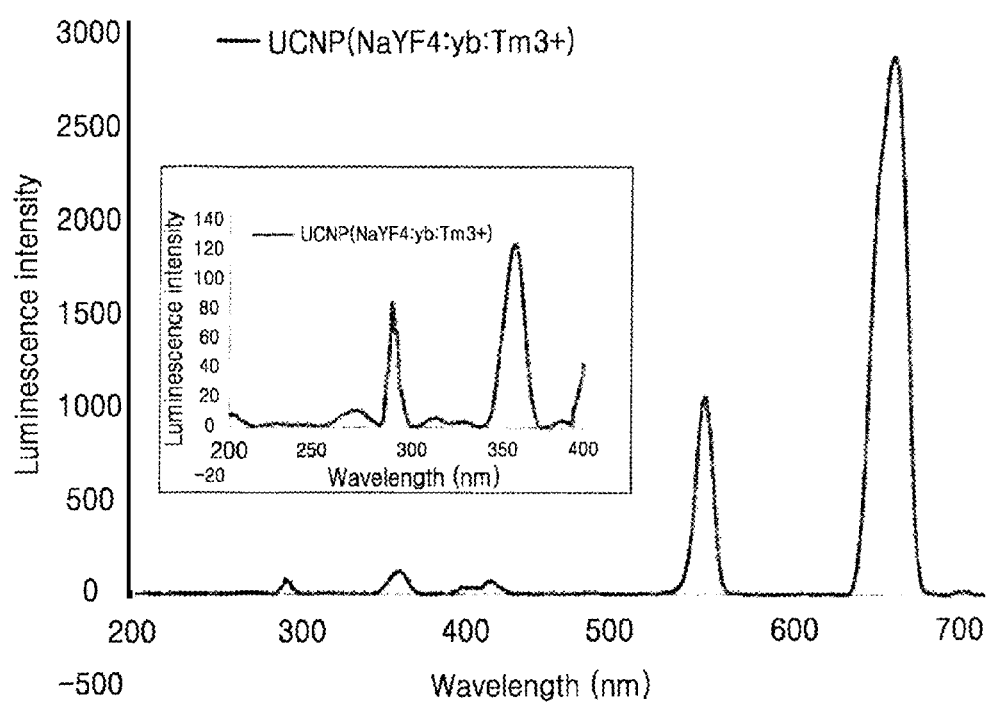
FIG. 5 shows results of measuring the spectrum of light emitted from the upconverting nanoparticles (UCNPs) upon irradiation with 980 nm near-infrared (NIR) laser diodes.

FIG. 5 shows results of measuring the spectrum of light emitted from the prepared UCNPs irradiated with a 980 nm near-infrared (NIR) laser diode using a fluorescence and luminescence spectrometer (FS-2, Shinco (Korea)). From the results shown in FIG. 5, it was confirmed that the UCNPs emitted light in the UV range.

Comparative Example 2

Confirmation of Characteristics of Titanium Dioxide-Coated UCNP

Figure 6:
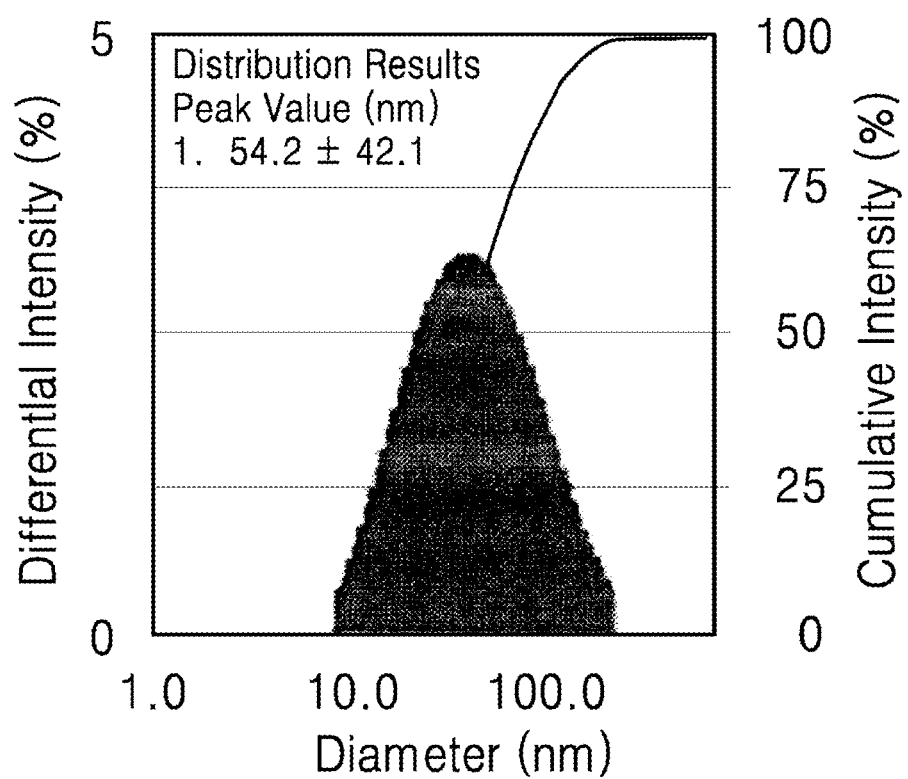
FIG. 6 shows results of analyzing the particle size of titanium dioxide-coated upconverting nanoparticles (UCNPs) prepared in examples using a particle size analyzer.

Titanium dioxide was coated onto surfaces of UCNPs by a sol-gel method using an ultrasonicator, and the coated particles were analyzed using a particle size analyzer. FIG. 6 shows results of analyzing the particle size of the titanium dioxide-coated UCNPs using a particle size and zeta potential analyzer (ELS Z, Photal Otsuka Electronics, Japan). From the results shown in FIG. 3 and FIG. 6, it was confirmed that the titanium dioxide-coated UCNPs had a greater size than the UCNPs.

Figure 11:
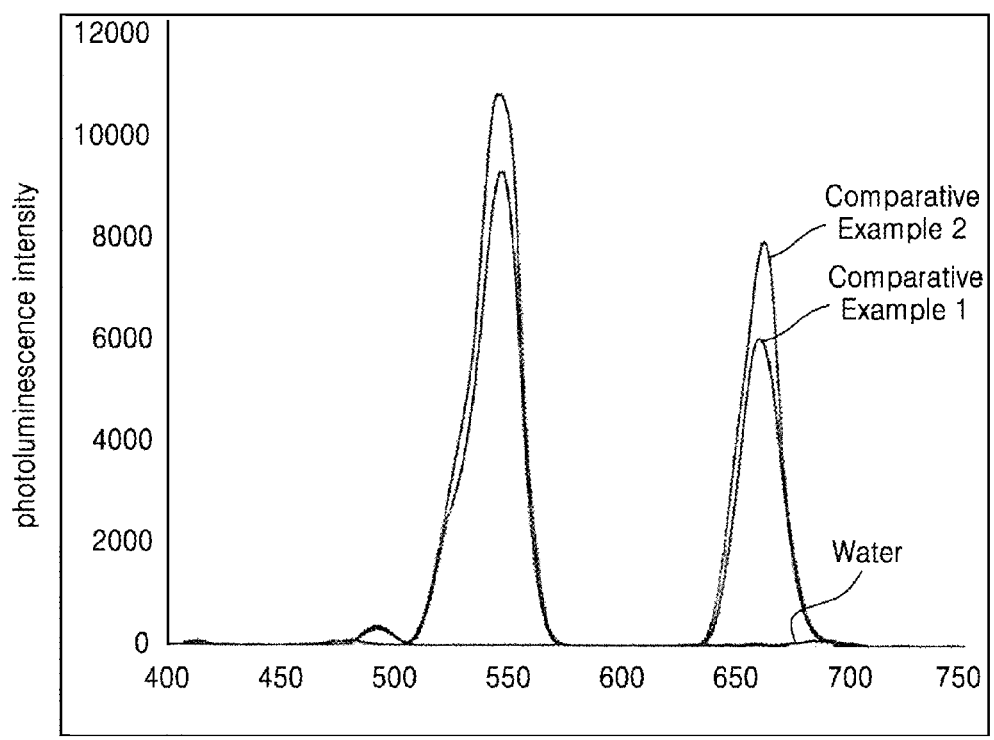
FIG. 11 is a graph showing results of measuring luminous efficiency of the titanium dioxide-coated UCNPs of Comparative Example 2 and the uncoated UCNPs of Comparative Example 1.

FIG. 11 is a graph showing that the titanium dioxide-coated UCNPs of Comparative Example 2 had higher luminous efficiency than the uncoated UCNPs of Comparative Example 1. As can be seen from this result, due to plasmonic effects, luminous efficiency of the titanium dioxide-coated UCNPs was increased by about 10% to about 15%, as compared with the uncoated UCNPs.

Example 1

Confirmation of Characteristics of UCNP-Coated Gold Nanorod

Biotin was introduced to surfaces of gold nanorods (GNRs) (shortest diameter: 10 nm, length of major axis: 40 nm) for surface modification, thereby preparing GNR-biotin particles and streptavidin (STA) was introduced to surfaces of titanium dioxide-coated upconverting nanoparticles (UCNPs) prepared in the same manner as in Comparative Example 2 for surface modification, thereby preparing UCNP-STA particles, followed by reacting two modified particles, i.e. the GNR-biotin particles and the UCNP-STA particles at room temperature for about 1 hour, thereby preparing a photocatalyst composite (GNR-biotin_UCNP-STA) in which the GNR-biotin particles were bonded to the UCNP-STA particles through high affinity between biotin and streptavidin.

Figure 7:
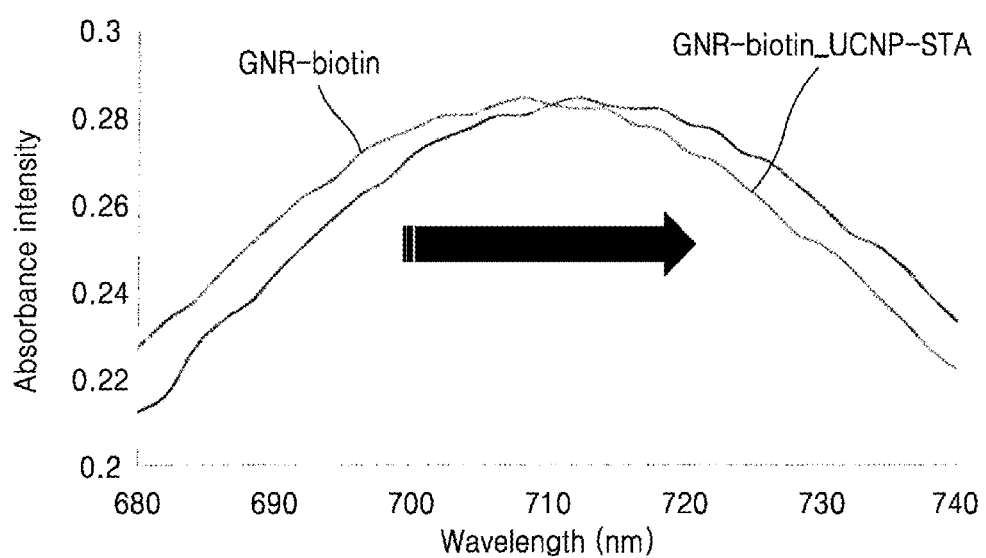
FIG. 7 shows results of measuring the absorption spectra of modified gold nanorods (GNR-biotin particles) and a photocatalyst composite (GNR-biotin_UCNP-STA) prepared in examples.

FIG. 7 shows results of measuring the absorption spectra of the modified gold nanorods (GNR-biotin particles) and the photocatalyst composite (GNR-biotin_UCNP-STA) using a multi-plate reader (Infinite M200 Pro, Tecan, Switzerland).

When other particles or materials were bonded to the surfaces of the gold nanorods, the intrinsic wavelength of the gold nanorods was shifted due to localized surface plasmon resonance (LSPR).

Referring to FIG. 7, it can be seen that bonds of GNR-biotin and UCNP-STA were formed in the photocatalyst composite (GNR-biotin_UCNP-STA) since the absorption spectrum of the photocatalyst composite (GNR-biotin_UCNP-STA) was shifted farther to the right than the absorption spectrum of the modified gold nanorods.

Figure 8:
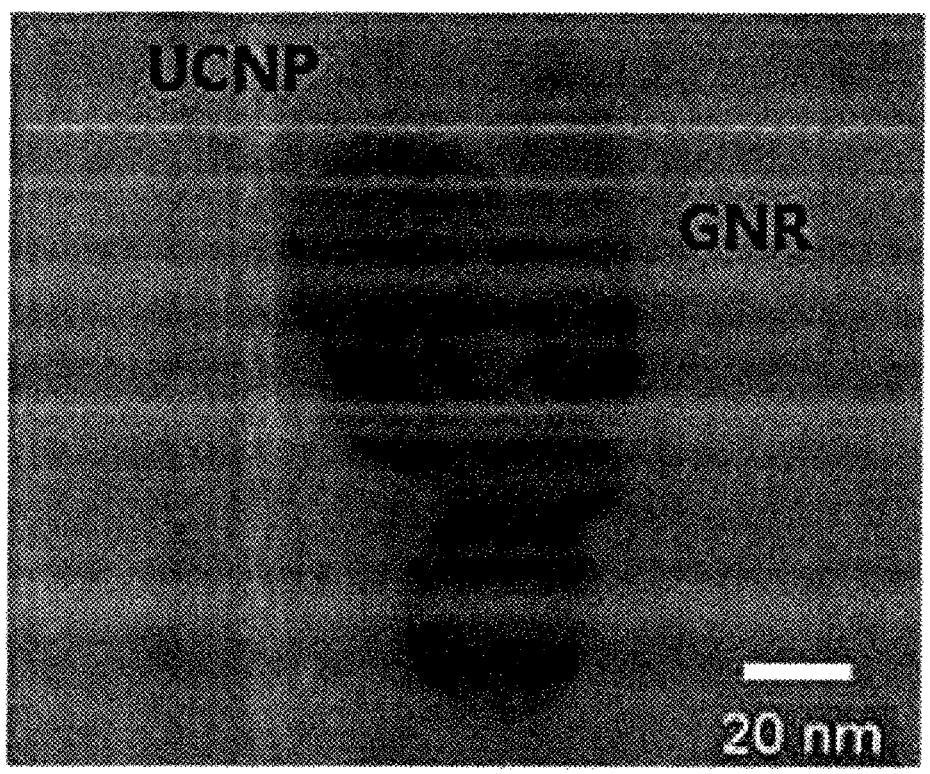
FIG. 8 is a transmission electron microscope (TEM) image of the photocatalyst composite prepared in examples.

FIG. 8 is a transmission electron microscope (TEM) image of the photocatalyst composite. From the TEM image of FIG. 8, it can be observed with the naked eye that GNR-biotin particles (rod shape) and UCNP-STA particles (spherical shape), which had different shapes, formed bonds.

Experimental Example 1

Confirmation of Photocatalytic Characteristics of Different Types of Titanium Dioxide-Coated UCNP/Gold Nanorod Photocatalyst Composites The UCNP-STA particles and the photocatalyst composite (GNR-biotin_UCNP-STA) prepared in Example 1 were irradiated by a 980 nm NIR laser diode, thereby measuring light emission amount at UV 280 nm using a fluorescence and luminescence spectrometer (FS-2, Shinco (Korea)).

Figure 9:
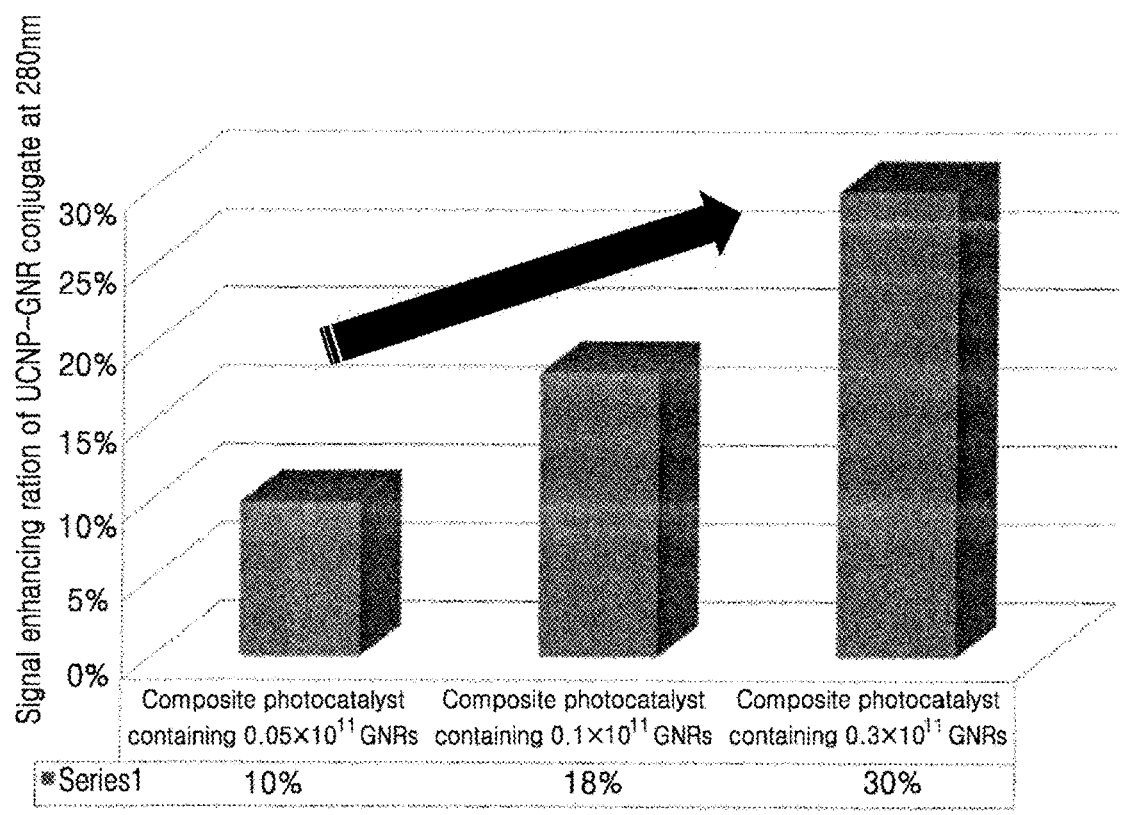
FIG. 9 is a graph showing the rate of increase in light emission amount at UV 280 nm of the photocatalyst composite (GNR-biotin_UCNP-STA) as compared with the modified titanium dioxide-coated upconverting nanoparticles (UCNP-STA), as measured after irradiating the photocatalyst composite and the modified titanium dioxide-coated upconverting nanoparticles with a 980 nm NIR laser diode.

FIG. 9 is a graph showing the rate of increase in light emission amount at UV 280 nm of the photocatalyst composite as compared with the UCNP-STA particles.

Increase in light emission amount of the photocatalyst composite as compared with the UCNP-STA particles means increase in plasmonic effects. Here, it was confirmed that plasmonic effects occurred by light in the UV range, i.e. at 280 nm.

In order to check increase in light emission amount with increasing concentration of gold nanorods, a photocatalyst composite (GNR-biotin_UCNP-STA) including $0.05 \times 10^{11}$ gold nanorods (GNRs), a photocatalyst composite (GNR-biotin_UCNP-STA) including $0.1 \times 10^{11}$ gold nanorods (GNRs), and a photocatalyst composite (GNR-biotin_UCNP-STA) including $0.3 \times 10^{11}$ gold nanorods (GNRs) were prepared in the same manner as in Example 1 and measured as to the light emission amount at 280 nm using a multi-plate reader (Infinite M200 Pro, Tecan (Switzerland)). As a result, it was confirmed that the light emission amounts of the photocatalyst composites were increased by 10%, 18%, and 30%, respectively, as compared with the UCNP-STA particles. FIG. 9 is a graph showing the rate of increase in light emission amount of the photocatalyst composites as compared with the UCNP-STA particles.

From the above results, it can be seen that increase in concentration of the gold nanorods caused increase in plasmonic effects, thereby allowing increase in the amount of light emitted from the titanium dioxide-coated UCNPs.

Experimental Example 2

Figure 10:
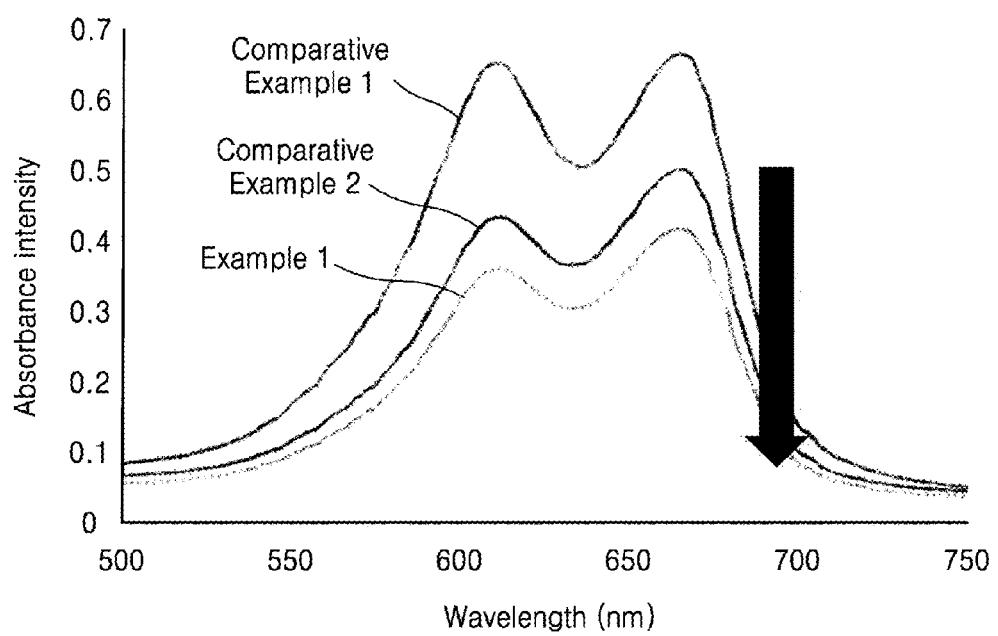
FIG. 10 shows the absorption spectra of methylene blue solutions photolyzed by the titanium dioxide-coated UCNPs, the modified titanium dioxide-coated upconverting nanoparticles (UCNP-STA), and the photocatalyst composite (GNR-biotin_UCNP-STA), prepared in examples.

Each of the upconverting nanoparticles (UCNPs) of Comparative Example 1, particles (UCNP-STA) obtained by modifying the titanium dioxide-coated upconverting nanoparticles of Comparative Example 2 with STA, and the photocatalyst composite (GNR-biotin_UCNP-STA) of Example 1 was placed in a methylene blue solution, followed by photolysis (methylene blue decomposes through photocatalysis). Then, in order to check the degree to which the amount of methylene blue was decreased by photolysis, the absorption spectrum of each of the photolyzed methylene blue solutions was measured using a multi-plate reader (Infinite M200 Pro, Tecan, Switzerland). FIG. 10 shows results of measuring the absorption spectra.

Referring to FIG. 10, it can be seen that the titanium dioxide-coated UCNPs of Comparative Example 2 exhibited high methylene blue decomposition rate as compared with the uncoated UCNPs of Comparative Example 1, and the photocatalyst composite including the gold nanorods of Example 1 exhibited high methylene blue decomposition rate as compared with the titanium dioxide-coated UCNPs of Comparative Example 2.

Although some embodiments have been described herein, it should be understood that these embodiments are provided for illustration only and are not to be construed in any way as limiting the present invention, and that various modifications, changes, alterations, and equivalent embodiments can be made by those skilled in the art without departing from the spirit and scope of the invention.

The invention claimed is:

1. A photocatalyst composite comprising: upconverting nanoparticles coated with a photocatalytic metal oxide; and gold nanorods.

2. The photocatalyst composite according to claim 1, wherein the number of upconverting nanoparticles is 2 to 8 times the number of gold nanorods.

3. The photocatalyst composite according to claim 1, wherein the upconverting nanoparticles comprise a rare-earth element.

4. The photocatalyst composite according to claim 1, wherein the photocatalytic metal oxide comprises at least one selected from the group consisting of titanium dioxide, tungsten oxide, zinc oxide, niobium oxide, and a combination thereof.

5. The photocatalyst composite according to claim 1, wherein the upconverting nanoparticles have an average diameter of 5 nm to 40 nm.

6. The photocatalyst composite according to claim 1, wherein the photocatalytic metal oxide is coated onto the upconverting nanoparticles to an average thickness of 2 nm to 20 nm.

7. The photocatalyst composite according to claim 1, wherein the gold nanorods have a rod shape, the shortest diameter of which ranges from 5 nm to 30 nm and the length of a major axis of which ranges from 30 nm to 150 nm.

8. The photocatalyst composite according to claim 1, wherein the upconverting nanoparticles coated with the photocatalytic metal oxide are physically or chemically bonded to the gold nanorods.

9. The photocatalyst composite according to claim 1, wherein the upconverting nanoparticles coated with the photocatalytic metal oxide are physically or chemically bonded to the gold nanorods through an intermediate compound.

10. The photocatalyst composite according to claim 1, wherein the upconverting nanoparticles coated with the photocatalytic metal oxide are bonded to the gold nanorods directly or through intermediate compounds.

11. The photocatalyst composite according to claim 1, wherein the photocatalyst composite is obtained by introducing a combination of streptavidin and biotin or a combination of an amine compound and a carboxyl acid-containing compound, as the intermediate compounds, to surfaces of the photocatalytic metal oxide and the gold nanorods, respectively, and bonding the upconverting nanoparticles to the gold nanorods.

\* \* \* \* \*